(12) United States Patent
Nagata

(10) Patent No.: US 9,539,953 B2
(45) Date of Patent: Jan. 10, 2017

(54) VEHICLE INTERIOR COMPONENT

(71) Applicant: Kojima Industries Corporation, Toyota-shi, Aichi (JP)

(72) Inventor: Takatsugu Nagata, Toyota (JP)

(73) Assignee: KOJIMA INDUSTRIES CORPORATION, Toyota-shi, Aichi (JP)

(*) Notice: Subject to any disclaimer, the term of this patent is extended or adjusted under 35 U.S.C. 154(b) by 0 days.

(21) Appl. No.: 14/745,924

(22) Filed: Jun. 22, 2015

(65) Prior Publication Data

US 2015/0375689 A1 Dec. 31, 2015

(30) Foreign Application Priority Data

Jun. 27, 2014 (JP) .................. 2014-132824

(51) Int. Cl.
*B60R 13/00* (2006.01)
*B60R 11/00* (2006.01)

(52) U.S. Cl.
CPC ........ *B60R 11/00* (2013.01); *B60R 2011/0047* (2013.01)

(58) Field of Classification Search
CPC .................. B60R 11/00; B60R 2011/0047
See application file for complete search history.

(56) References Cited

U.S. PATENT DOCUMENTS

| 6,338,517 B1 * | 1/2002 | Canni | ............... B60R 7/04 224/281 |
| RE40,617 E * | 1/2009 | Canni | ............... B60R 7/04 224/281 |

FOREIGN PATENT DOCUMENTS

| JP | 2008001318 A | 1/2008 |
| JP | 200924888 A | 10/2009 |
| JP | 201120732 A | 10/2011 |
| JP | 201206672 A | 4/2012 |

OTHER PUBLICATIONS

Japanese Notice of Grounds for Rejection corresponding to Patent Application No. 2014-132824; Mailed Date: Aug. 18, 2015, with English translation.

* cited by examiner

*Primary Examiner* — Lori L Lyjak
(74) *Attorney, Agent, or Firm* — Cantor Colburn LLP

(57) ABSTRACT

A vehicle interior component includes a base member fixed to a structural member, and a panel member attached to a vehicle compartment inner side of the base member so that its outer peripheral portion is pressed to a lining member from the vehicle compartment inner side. The panel member includes a panel protrusion protruding on a vehicle compartment outer side in the peripheral part of its outer peripheral edge, and the panel protrusion has an insertion hole into which a lock portion formed in the base member or a base fixing member fixed to the base member is inserted, and an auxiliary claw protruding on an outer peripheral edge side. The auxiliary claw engages with the base member to prevent the displacement of the panel protrusion to the vehicle compartment inner side when the outer peripheral portion of the panel member receives a load from the lining member.

3 Claims, 9 Drawing Sheets

FIG. 12A
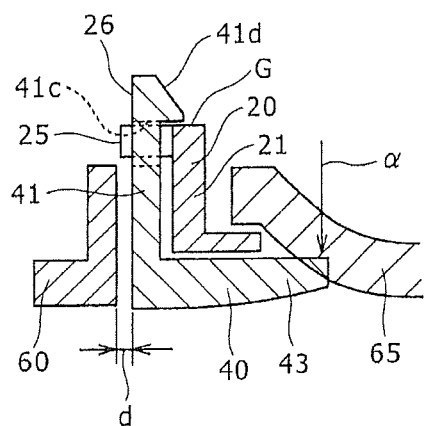
FIG. 12B
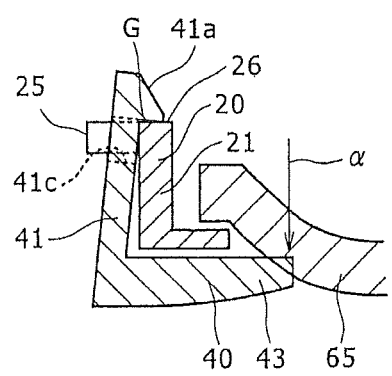
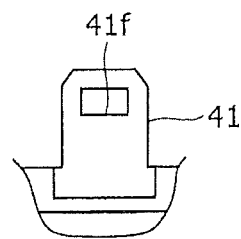
FIG. 13A

FIG. 15A     FIG. 15B
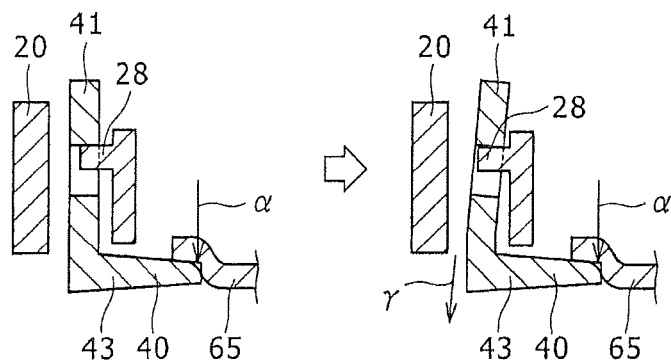
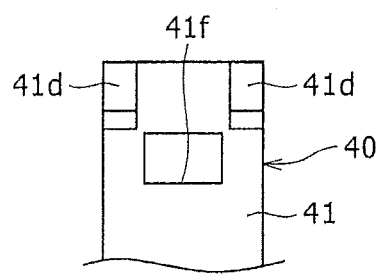
FIG. 16
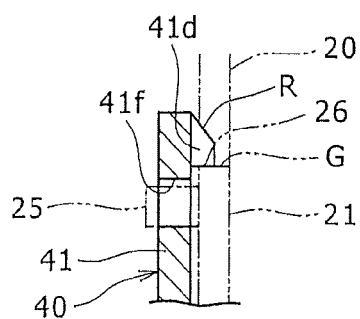
FIG. 17

VEHICLE INTERIOR COMPONENT

CROSS REFERENCE TO RELATED APPLICATIONS

The present invention claims priority under 35 U.S.C. §119 to Japanese Application No. 2014-132824, filed on Jun. 27, 2014, the entire content of which is incorporated herein by reference.

BACKGROUND

Technical Field

The present invention relates to a vehicle interior component attached to a structural member of a vehicle.

Related Art

Heretofore, an overhead console has been provided as a vehicle interior component on the ceiling side of a vehicle compartment of a vehicle. The overhead console is attached to a ceiling structural member of the automobile, and generally has an operation unit for electric component operation. An overhead console described in Japanese Patent Publication Laid-open No. 2008-1318 includes a base member, and units that are attached to the base member, such as an illumination unit, an operation unit for switching the illumination unit on and off, and a storage unit for small articles. The base member is attached to a member on the side of the ceiling.

According to the conventional art, in the vehicle interior component, a panel member which is pressed to a lining member may come away, and the lining member may be detached. For example, in the overhead console described in Japanese Patent Publication Laid-open No. 2008-1318, the base member attached to the ceiling structural member and the panel member inside the vehicle compartment may be configured to be set together. A lock portion formed in the base member may be inserted into and locked to an insertion hole of the panel member to set the panel member to the base member. However, in this structure, the outer peripheral edge of the panel member receives a load as reaction force from the ceiling lining member, and the panel member may be deformed and partly come away from the base member. As a result, the ceiling lining member may not be held by the panel member, and the ceiling lining member may be detached and, for example, may hang down.

SUMMARY

An object of the present invention is to prevent a panel member which is pressed to a lining member from coming away and thus prevent the lining member from being detached in a vehicle interior component.

A vehicle interior component according to the present invention which is attached to a structural member of a vehicle includes a base member fixed to the structural member, and a panel member attached to a vehicle compartment inner side of the base member so that its outer peripheral portion is pressed to a lining member of the vehicle from the vehicle compartment inner side, wherein the panel member includes a panel protrusion protruding on a vehicle compartment outer side in the peripheral part of its outer peripheral edge, the panel protrusion having an insertion hole into which a lock portion formed in the base member or a base fixing member fixed to the base member is inserted, and an auxiliary claw protruding on an outer peripheral edge side, and the auxiliary claw engages with the base member to prevent the displacement of the panel protrusion to the vehicle compartment inner side when the outer peripheral portion of the panel member receives a load from the lining member.

BRIEF DESCRIPTION OF THE DRAWINGS

FIGS. 12A and 12B are views showing how the deformation of the panel member is inhibited when a load is applied to the panel member from a ceiling lining member in the embodiment according to the present invention;

FIG. 13A is a view corresponding to FIG. 9A in an overhead console according to a comparative example;

FIGS. 15A and 15B are views showing how a panel member is deformed when a load is applied to the panel member from a ceiling lining member in another comparative example;

FIG. 16 is a view corresponding to FIG. 9A in another example of the embodiment according to the present invention; and FIG. 17 is a view from the left side of FIG. 16.

DESCRIPTION OF EXEMPLARY EMBODIMENTS

Figure 1:
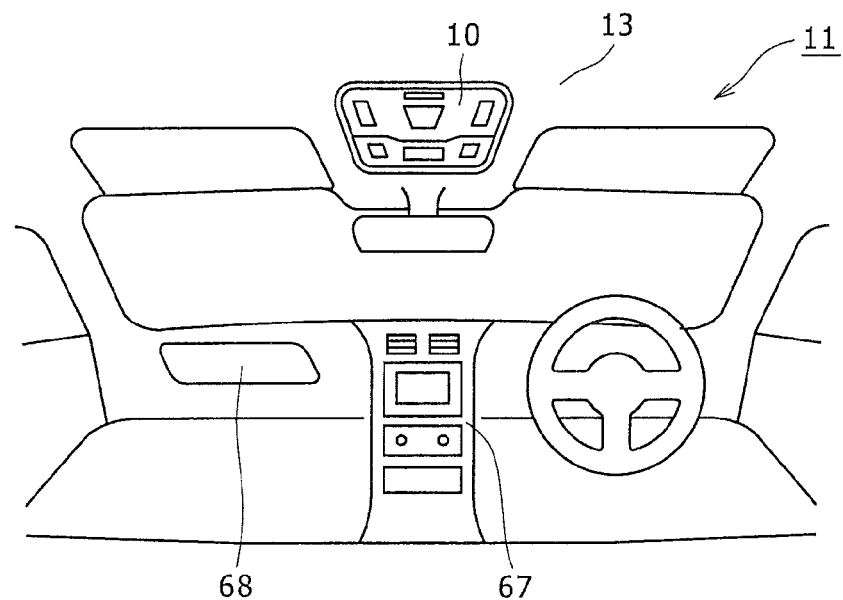
FIG. 1 is a perspective view of an overhead console which is a vehicle interior component according to an embodiment of the present invention when viewed from the inside of a vehicle compartment.

An embodiment of the present invention will be described in detail hereinafter with reference to the drawings. Although a vehicle interior component is an overhead console which has no covered storage unit in the case described below, the vehicle interior component may be an overhead console which has a covered storage unit such as a compartment for glasses. Materials and numbers described below are illustrative only, and can be changed depending on the specifications of the vehicle interior component. Similar elements are described below using similar reference numerals throughout the drawings.

Figure 2:
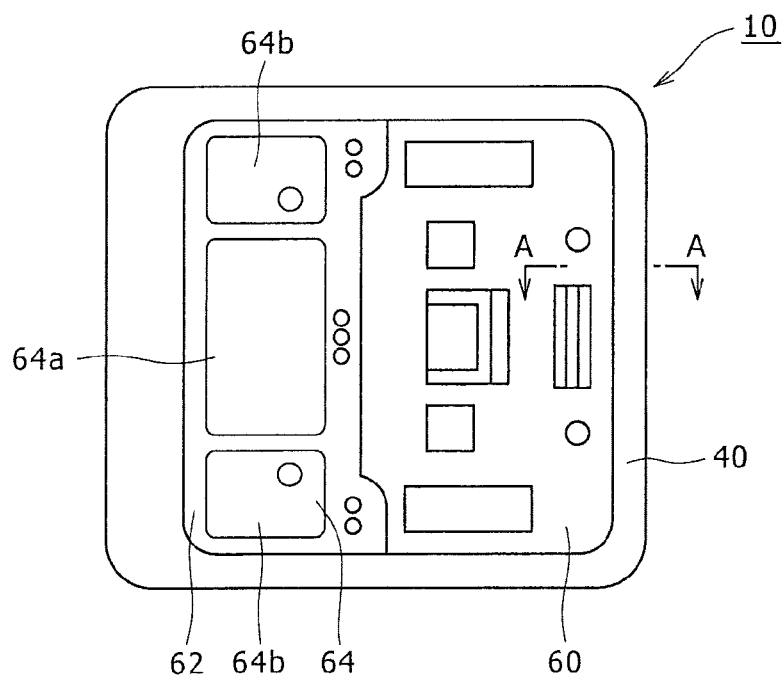
FIG. 2 is a diagram of the overhead console shown in FIG. 1 when viewed toward the ceiling from the inside of the vehicle compartment.
Figure 3:
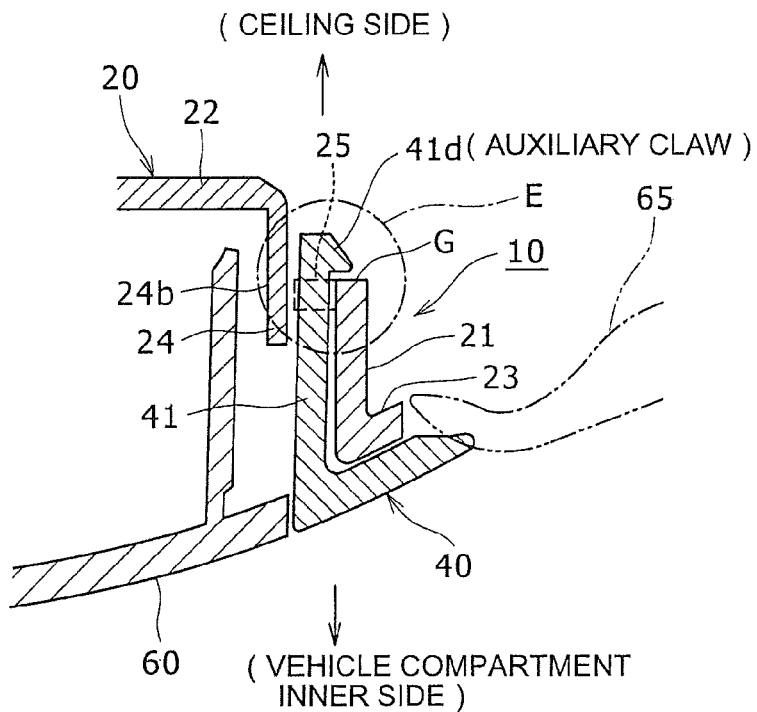
FIG. 3 is a sectional view taken along the line A-A in FIG. 2.

FIG. 1 is a perspective view of an overhead console 10 according to the embodiment when viewed from the inside of a vehicle compartment of a vehicle 11. FIG. 2 is a diagram of the overhead console 10 when viewed toward the ceiling from the inside of the vehicle compartment. FIG. 3 is a sectional view taken along the line A-A in FIG. 2.

The overhead console 10 is attached to a ceiling structural member 12 (FIG. 10) such as a reinforcing panel of the vehicle 11. The overhead console 10 is generally attached to the center of front seats in the lateral direction on a ceiling 13, but may be attached to the center of rear seats in the lateral direction. The overhead console 10 will hereinafter be simply referred to as a "console 10".

As shown in FIG. 2 and FIG. 3, the console 10 includes a base member 20 (FIG. 3) fixed to the ceiling structural member 12, a panel member 40 attached to the vehicle compartment inner side of the base member 20, a bezel, a lens, and an illumination unit 64.

Figure 4:
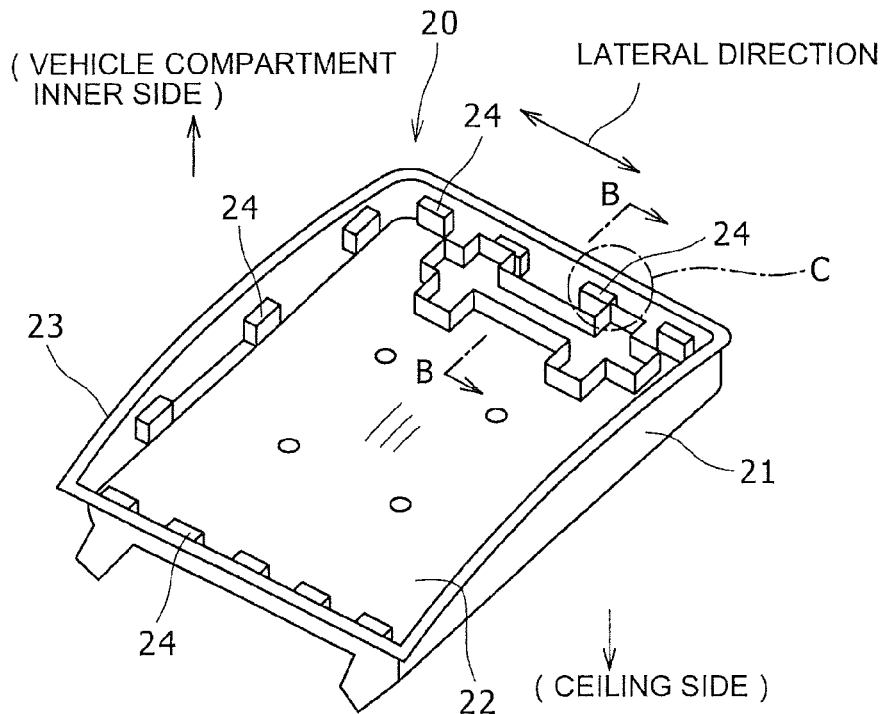
FIG. 4 is a perspective view of a base member constituting the overhead console shown in FIG. 2 when viewed from the vehicle compartment inner side.
Figure 5:
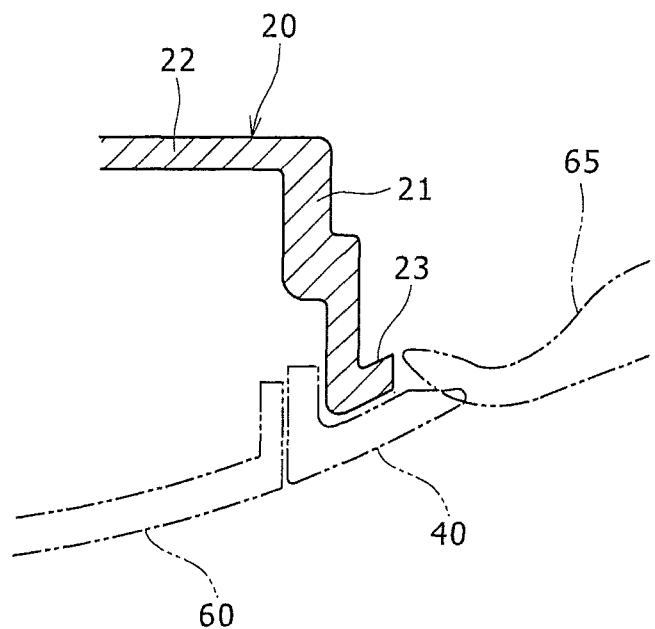
FIG. 5 is a sectional view taken along the line B-B in FIG. 4.

FIG. 4 is a perspective view of the base member 20 constituting the console 10 when viewed from the vehicle compartment inner side. FIG. 5 is a sectional view taken along the line B-B in FIG. 4. The base member 20 has a peripheral wall 21 which is a base wall having a substantially rectangular sectional shape, and a bottom plate 22 which closes the end of the peripheral wall 21 on the ceiling side which is a vehicle compartment outer side. The base member 20 is box-shaped. The base member 20 is attached to a member on the side of the ceiling upside down compared to the state shown in FIG. 4. The base member 20 is integrally molded by a resin. Both lateral edges at the end of the base member 20 on the vehicle compartment inner side are curved to slightly project on the vehicle compartment inner side. An outer flange 23 is circumferentially formed at the end of the peripheral wall 21 on the vehicle compartment inner side.

Figure 6:
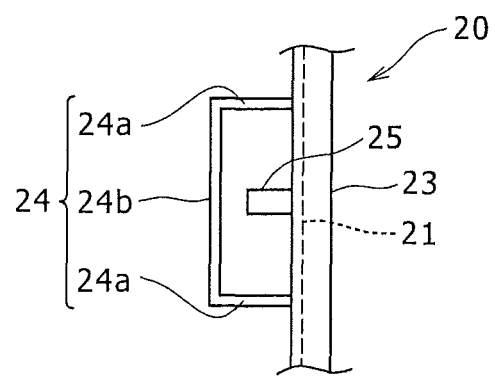
FIG. 6 is an enlarged view of a part C in FIG. 4.

In the base member 20, insertion walls 24 are integrally formed at a plurality of places in the inner peripheral part of the peripheral wall 21. FIG. 6 is an enlarged view of a part C in FIG. 4. Each of the insertion walls 24 includes two parallel first walls 24a protruding from the side surface of the peripheral wall 21, and a second wall 24b perpendicularly joined to one end of each of the first walls 24a. Each of the insertion walls 24 has a rectangular section. The end of each of the insertion walls 24 on the vehicle compartment inner side is open, and the end of each of the insertion walls 24 on the ceiling side passes through the ceiling side of the base member 20. Returning to FIG. 3, the end of the second wall 24b on the ceiling side is vertically coupled to the bottom plate 22 in the part of the peripheral wall 21 where the insertion wall 24 is disposed.

Figure 9A:
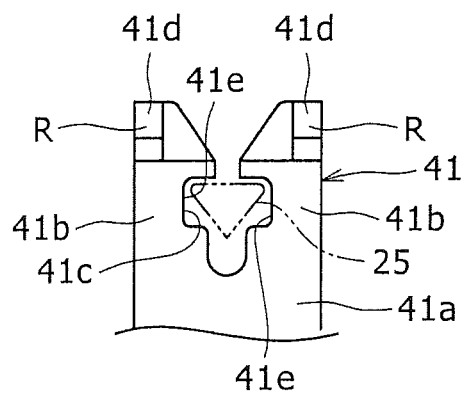
FIG. 9A is an enlarged view of a part D in FIG. 8.

A columnar lock protrusion 25 having a triangular section which is a lock portion as shown in FIG. 9A is formed on the inner surface facing the second wall 24b so as to protrude into the insertion wall 24 in the part of the peripheral wall 21 surrounded by the first walls 24a and the second wall 24b. The sectional shape of the lock protrusion 25 may be polygonal, for example, rectangular, or may be circular.

Figure 11:
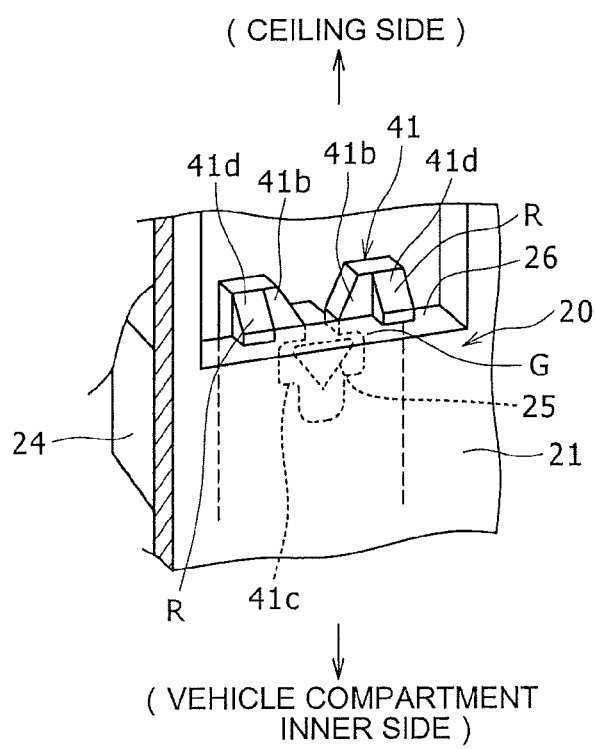
FIG. 11 is a perspective view of a part E in FIG. 3.

Referring to FIG. 11 described later, an opening 26 is formed in the part of the peripheral wall 21 around the end of the insertion wall 24 on the ceiling side. The lock protrusion 25 is formed closer to the vehicle compartment inner side than the opening 26. Panel protrusions 41 of the later-described panel member 40 are inserted into the insertion walls 24.

Figure 7:
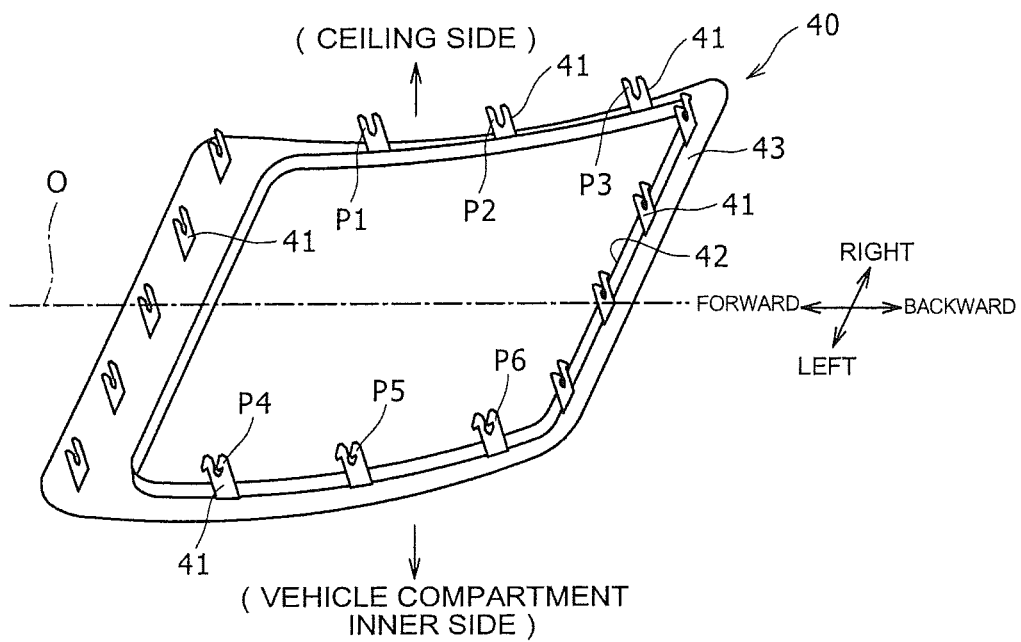
FIG. 7 is a view of a panel member constituting the overhead console shown in FIG. 2 when viewed from the ceiling side.

FIG. 7 is a view of the panel member 40 when viewed from the ceiling side. The panel member 40 includes a main body 43 which is formed into a rectangular plate shape having a window 42 inside, and a plurality of panel protrusions 41. The main body 43 is curved so as to slightly protrude on the vehicle compartment inner side as a whole in accordance with the shape of the end of the base member 20 shown in FIG. 4 on the vehicle compartment inner side. The inner side (the upper side in FIG. 7) of this curved part is pressed to the end of the base member 20 on the vehicle compartment inner side. The main body 43 is not exclusively curved, and may be simply formed into a frame shape of a flat plate.

The panel protrusions 41 protrude on the ceiling side from a plurality of positions facing the respective insertion walls 24 when set to the base member 20 on the ceiling side surface of the main body 43. The panel protrusions 41 are formed at a plurality of positions at both longitudinal ends and both lateral ends of the vehicle in the peripheral part of the outer edge of the panel member 40. The panel protrusions 41 located at both lateral ends indicated by P1, P2 . . . P6 in FIG. 7 are arranged symmetrically with respect to a vertical plane S (FIG. 8) including an axis O longitudinally extending in the center of the lateral direction. The panel member 40 is also integrally formed by a resin in the same manner as the base member 20.

Figure 8:
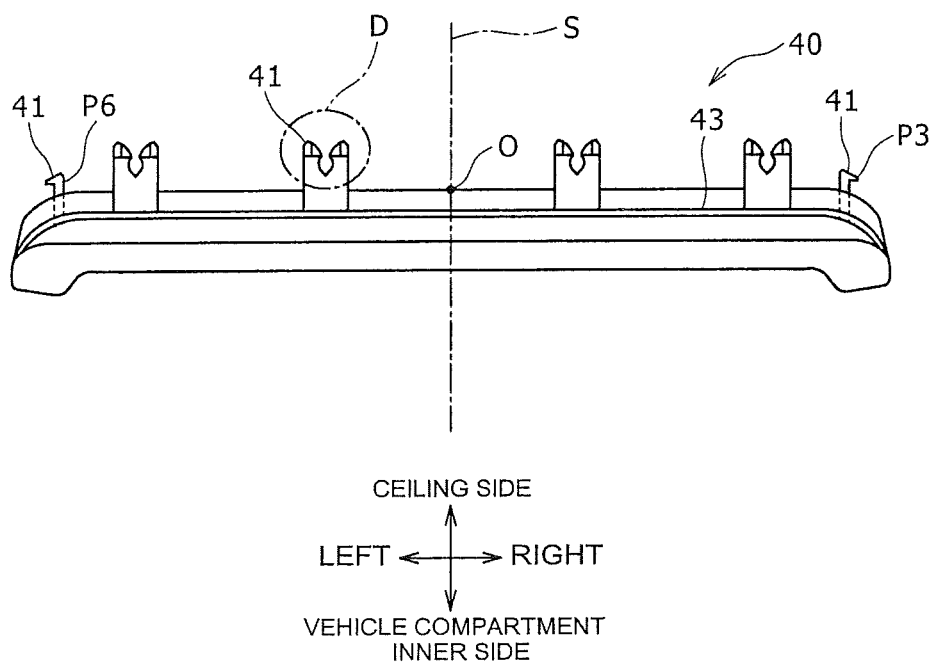
FIG. 8 is a view of the panel member shown in FIG. 7 when viewed from the right side.
Figure 9B:
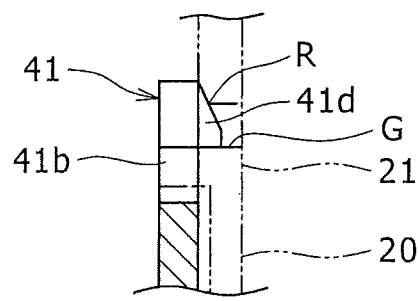
FIG. 9B is a view from the left side of FIG. 9A.
Figure 9C:
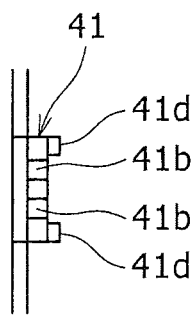
FIG. 9C is a view from the upper side of FIG. 9B.

FIG. 8 is a view of the panel member 40 shown in FIG. 7 when viewed from the right side. FIG. 9A is an enlarged view of a part D in FIG. 8. FIG. 9B is a view from the left side of FIG. 9A. FIG. 9C is a view from the upper side of FIG. 9B.

Each of the panel protrusions 41 protrudes from the peripheral part of an outer peripheral edge of the ceiling side surface of the main body 43 along the outer peripheral edge. Each of the panel protrusions 41 includes a plate-shaped root side portion 41a disposed parallel to the outer peripheral edge of the panel member 40, two arms 41b, an insertion hole 41c, and two auxiliary claws 41d. The arms 41b protrude separately from the root side portion 41a to the ceiling side. The insertion hole 41c is formed between the two arms 41b. Specifically, a recess 41e is formed in the longitudinally middle part at opposite inner edges of the arms 41b, and the space therebetween is smaller on the tip side than in the recess 41e. Thus, the T-shaped insertion hole 41c is formed between the arms 41b. The insertion hole 41c is not limited to this shape, and may be shaped to have, for example, a circular or rectangular section. As will be described later, the lock protrusion 25 of the base member 20 is inserted into and locked to the insertion hole 41c.

The auxiliary claws 41d protrude on the outer peripheral edge side from positions located apart from each other in the width direction (the lateral direction in FIG. 9A) on the side surfaces of the panel member 40 on the outer peripheral edge side (the front side in FIG. 9A, and the right side in FIG. 9B and FIG. 9C) at the tip of each of the arms 41b closer to the ceiling side than the insertion hole 41c. The section of each of the auxiliary claws 41d is in a trapezoidal shape having an inclined plane R which is inclined so that the thickness is smaller on the tip side. The auxiliary claw 41d is not limited to this shape, and may have, for example, a triangular sectional shape with an inclined plane which is inclined so that the thickness is smaller on the tip side. As will be described in detail later, the auxiliary claws 41d engage with the peripheral wall 21 of the base member 20 to prevent the displacement of the panel protrusions 41 toward the vehicle compartment inner side when the outer peripheral edge portion of the main body 43 of the panel member 40 receives a load as reaction force from a ceiling lining member 65. The ceiling lining member 65 is called a ceiling trim.

As shown in FIG. 3, when the panel protrusion 41 is inserted in each of the insertion walls 24, the peripheral wall 21 of the base member 20 faces the outer peripheral edge side (the right side in FIG. 3) in the panel protrusion 41.

Figure 10:
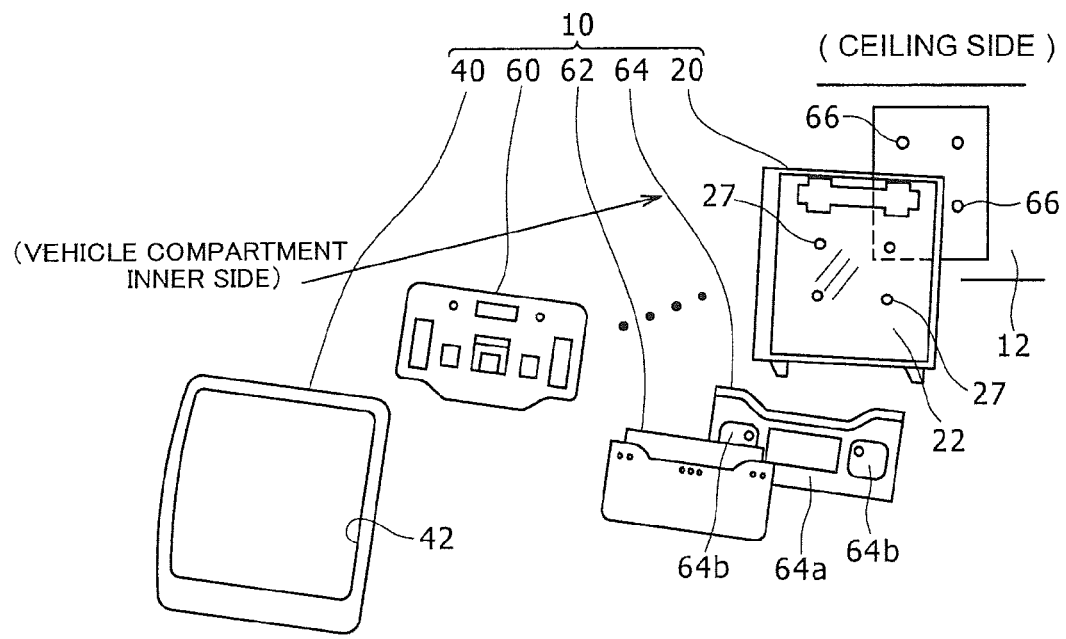
FIG. 10 is an exploded perspective view of the overhead console shown in FIG. 2.

FIG. 10 is an exploded perspective view of the overhead console 10. A bezel 60 and a lens 62 are arranged in the longitudinal direction (the vertical direction in FIG. 10) so that the bezel 60 and the lens 62 are exposed on the vehicle compartment inner side from the inside of the window 42 of the panel member 40. The illumination unit 64 has a case 64*a*, and an illumination main body 64*b* supported by both lateral sides of the case 64*a*. The illumination unit 64 is disposed inside the base member 20 so as to face the inner surface (the rear surface in FIG. 10) of the lens 62. The illumination unit 64 also has a function as a lens guide which supports the lens 62. The bezel 60, the lens 62, and the illumination unit 64 are joined to the base member 20 or the panel member 40 by screws or by projection-recess engagement. Operation switches for electric component operation such as an illumination operation switch, a door interlocked knob which operates in response to the opening/closing of a door, a substrate, and others that are not shown are disposed inside the base member 20. The bezel 60 has a plurality of bores, and components such as operation switches and the door interlocked knob are exposed on the vehicle compartment inner side from the bores.

The components of this console 10 are combined and joined as shown in FIG. 10. In the setting operations of the components, each of the panel protrusions 41 of the panel member 40 is inserted into each of the insertion walls 24 of the base member 20 so that the end of the auxiliary claws 41*d* and the arms 41*b* side is inserted first. FIG. 11 is a perspective view of a part E in FIG. 3. In accordance with the insertion operation for the panel protrusions 41, the panel protrusions 41 move toward the bottom plate 22 (the upper side in FIG. 11) along the inner surface of the peripheral wall 21 of the base member 20, and the auxiliary claws 41*d* are pressed by the inclined plane R on the inner surface of the peripheral wall 21 and thus elastically deformed inward. After the auxiliary claws 41*d* have protruded toward the bottom plate 22 further than a vehicle compartment inner edge G of the opening 26 formed in the peripheral wall 21, the auxiliary claws 41*d* are elastically restored inside the opening 26 and are therefore engaged with the vehicle compartment inner edge G. When the auxiliary claws 41*d* are deformed, the space between the arms 41*b* elastically widens so that the lock protrusion 25 is inserted into the insertion hole 41*c* through the space between the tips of the arms 41*b*.

Returning to FIG. 10, bores 27 are formed at a plurality of positions in the bottom plate 22 of the base member 20, and the bores 27 face a plurality of bores 66 formed in the ceiling structural member 12. In this condition, clips comprising a plurality of unshown clip elements are partly inserted into and attached to the bores 66, and the base member 20 is fixed to the ceiling structural member 12. As a result, the console 10 is attached to the ceiling structural member 12.

A reinforcing rib and an intermediate wall to attach various components may be formed in a protruding manner on the vehicle compartment inner surface of the bottom plate 22 of the base member 20.

When the console 10 is attached to the ceiling side in this manner, the outer peripheral edge portion of the main body 43 of the panel member 40 is pressed to the ceiling lining member 65 attached to the vehicle compartment inner side of the ceiling structural member 12 from the vehicle compartment inner side (lower side) as shown in FIGS. 12A and 12B. As a result, the ceiling lining member 65 is mounted on the outer peripheral edge of the panel member 40 from the upper side. The outer peripheral edge portion of the main body 43 then receives a load as reaction force of the pressing force from the ceiling lining member 65 as indicated by an arrow a in FIG. 12(A). Thus, the outer peripheral edge of the main body 43 is deformed downward. As shown in FIG. 12(B), bending moment is generated so that the panel protrusions 41 located in the peripheral part of the outer peripheral edge of the main body 43 will be inclined relative to the side surface of the peripheral wall 21. However, the auxiliary claws 41*d* engage with the vehicle compartment inner edge G of the opening 26 of the base member 20 and prevent the displacement of the panel protrusions 41 toward the vehicle compartment inner side, which prevents the panel protrusions 41 from being considerably inclined and displaced downward at the same time. Thus, it is possible to prevent the lock protrusion 25 from being pulled out of the insertion hole 41*c*. Consequently, it is possible to prevent the panel member 40 from coming away from the base member 20, and therefore prevent the ceiling lining member 65 from hanging down due to detachment. As a result, generation of noise caused by the vibration of the ceiling lining member 65 can be prevented.

It is not necessary to excessively reduce dimensional tolerance to increase the fitting strength between the lock protrusion 25 and the insertion hole 41*c* and thus prevent the lock protrusion 25 from being pulled out of the insertion hole 41*c*, so that the manufacturing operability of the components can be improved. Moreover, it is not necessary to join the panel member 40 to the base member 20 by fastening members such as screws, so that setting operability is satisfactory.

The panel protrusion 41 includes the separated arms 41*b*. The insertion hole 41*c* is formed between the arms 41*b*. The auxiliary claws 41*d* are formed on the outer peripheral edge side (the right side in FIGS. 12A and 12B) of each of the arms 41*b*. Thus, when the panel protrusion 41 is formed by the injection molding of a resin, it is possible to prevent the production of a weld line in the resin, so that high strength of each of the auxiliary claws 41*d* can be maintained for a long period. Therefore, the function of the auxiliary claws 41*d* can be maintained for a long period. The tip of the panel protrusion 41 is formed into separated-arm-shaped, so that when the panel member 40 is set in the base member 20, the separated arms 41*b* elastically open to allow the insertion of the lock protrusion 25 into the insertion hole 41*c*. Thus, it is not necessary to set the panel protrusion 41 in the inside of the base member 20 while pressing the panel protrusion 41 by the lock protrusion 25 and thereby elastically inclining the panel protrusion 41 relative to the peripheral wall 21 so that the upper part of the panel protrusion 41 will be separated from the side surface of the peripheral wall 21. Therefore, it is not necessary to set a large space d between the panel protrusion 41 and a member facing the panel protrusion 41 opposite to the lock protrusion 25 so that the panel protrusion 41 can be inclined. Alternatively, the space d can be eliminated. For example, the space d between the panel protrusion 41 and the bezel 60 can be sufficiently reduced. Therefore, it is possible to improve the degree of freedom for designs formed on the vehicle compartment inner side of the console 10.

In the peripheral part of the outer peripheral edge of the panel member 40, the auxiliary claws 41*d* are formed at a plurality of positions at both longitudinal ends and both lateral ends. Thus, the auxiliary claws 41*d* serve as setting references so that setting is easily performed by centering the panel member 40 relative to the base member 20. Moreover, since the panel protrusions 41 located at both lateral ends are arranged symmetrically with respect to the vertical plane S, this setting condition can be more precisely obtained. The panel protrusions 41 located at both lateral ends may be arranged symmetrically with respect to the vertical plane S, and/or the panel protrusions 41 located at both longitudinal ends may be arranged symmetrically with respect to a vertical plane including an axis laterally extending in the center of the longitudinal direction of the panel protrusions 41. This also facilitates setting in the centering state.

Even if the auxiliary claws 41*d* are set in a condition different from the normal setting positions during the setting, the base member 20 significantly interferes with the auxiliary claws 41*d*, so that an operator can judge the improper setting along the way and stop the operation. For example, it is easier to choose whether the part to be initially set is a part in the vicinity of the end or the center of the panel member 40 in the longitudinal direction or lateral direction. During the setting, the auxiliary claws 41*d* are pressed to the side face of the peripheral wall 21 by the inclined plane R so that thinner sides can be pushed in by relatively low force. Therefore, operability in the setting and positioning can be increased.

Figure 13B:
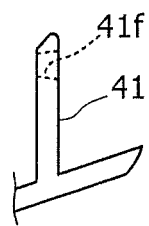
FIG. 13B is a view from the left side of FIG. 13A.
Figure 13C:
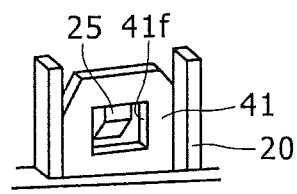
FIG. 13C is a perspective view showing how a lock protrusion of a base member is inserted into an insertion hole of a panel protrusion according to the comparative example.
Figure 14:
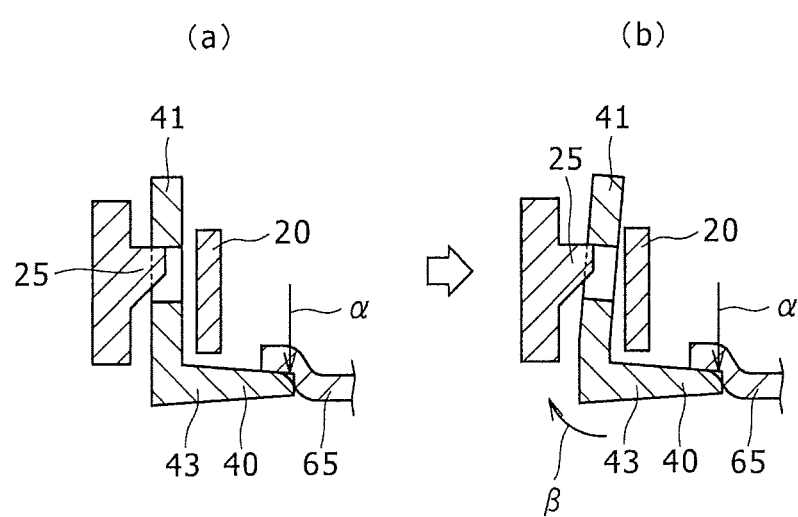
FIG. 14 is a view showing how a panel member is deformed when a load is applied to the panel member from a ceiling lining member in the comparative example.

FIG. 13A is a view corresponding to FIG. 9A in a console according to a comparative example. FIG. 13B is a view from the left side of FIG. 13A. FIG. 13C is a perspective view showing how the lock protrusion 25 formed in the base member 20 is inserted into an insertion hole 41*f* of the panel protrusion 41 in the comparative example. FIG. 14 is a view showing how the panel member 40 is deformed when a load is applied to the panel member 40 from the ceiling lining member 65 in the comparative example.

In the comparative example, the tip of the panel protrusion 41 is not formed into separated-arm-shaped, and the panel protrusion 41 is plate-shaped. The insertion hole 41*c* having a rectangular section is formed at the tip of the panel protrusion 41. As shown in FIG. 13C, the lock protrusion 25 formed in the base member 20 is inserted into and locked to the insertion hole 41*c*. In this comparative example, when, as shown in FIG. 14(*a*), a load as reaction force is applied to the outer peripheral edge of the main body 43 of the panel member 40 from the ceiling lining member 65 in the arrow α direction, a bending moment in an arrow β direction is applied to the peripheral part of the outer peripheral edge of the panel member 40 as shown in FIG. 14(*b*). As a result, the panel protrusion 41 is greatly inclined and greatly deformed downward at the same time, so that the insertion hole 41*c* of the panel protrusion 41 may come away from the lock protrusion 25. Therefore, part of the panel member 40 comes away from the base member 20, and the ceiling lining member 65 can not be held at this part. In this case, the ceiling lining member 65 may be detached and hang down.

FIGS. 15A and 15B are views showing how the panel member 40 is deformed when a load is applied to the panel member 40 from the ceiling lining member 65 in another comparative example. In the other comparative example, a lock protrusion 28 is formed in the part of the base member 20 facing the outer peripheral edge side of the panel protrusion 41, and the lock protrusion 28 is inserted into the insertion hole 41*c* of the panel protrusion 41, in contrast with the case of FIG. 14. In such a configuration, when a load in the arrow α direction is applied from the ceiling lining member 65 as shown in FIG. 15(A), the panel protrusion 41 is inclined closer to the lock protrusion 25 as shown in FIG. 15(B), but the panel protrusion 41 is deformed to slip off in an arrow γ direction, and the panel protrusion 41 may come off the base member 20 after all. According to the present embodiment, all the inconveniences described in FIG. 14 and FIGS. 15A and 15B can be eliminated.

Although the lock protrusion 25 is formed in the base member 20 facing the outer peripheral edge side of the panel protrusion 41 in the embodiment described above, the member facing the inner space side of the base member 20 in the panel protrusion 41, for example, the lock protrusion 25 which protrudes toward the panel protrusion 41 in the second wall 24*b* in FIG. 3 may be formed. In FIG. 3, a column which is a lock portion crossed and coupled to the second wall 24*b* and to the base member 20 facing the outer peripheral edge side of the second wall 24*b* may be formed. In this case as well, the separated arms 41*b* are formed in the panel protrusion 41, so that it is possible to elastically expand the arms 41*b* and simultaneously push the arms 41*b* into the base member 20 to insert the column into the insertion hole 41*c* and lock the column.

Although the auxiliary claws 41*d* of the panel protrusion 41 are locked to the peripheral wall 21 of the base member 20 in the case described according to the embodiment described above, the auxiliary claws 41*d* may be configured to be locked to the vehicle compartment inner edge of a bore provided in the part of the base member 20 formed closer to the inner side than the peripheral wall 21.

The bezel 60 fixed to the base member 20 may be used as a base fixing member to form the lock protrusion 25 which is a lock portion in the bezel 60. For example, when a bezel protrusion protruding on the ceiling side is formed in the bezel 60, the lock protrusion 25 which is locked to the insertion hole 41*c* of the panel protrusion 41 may be formed on the side of the bezel protrusion facing the panel protrusion 41. The lock protrusion locked to the insertion hole 41*c* may be a resin component fixed inside the base member 20 in parts other than the bezel 60.

FIG. 16 is a view corresponding to FIG. 9A in another example of the embodiment. FIG. 17 is a view from the left side of FIG. 16. In this example, the panel protrusion 41 does not have the separated arms 41*b* (FIG. 9A). Instead, the panel protrusion 41 is formed into a plate shape having the insertion hole 41*c* with a rectangular section, as in the comparative example in FIG. 13A. The auxiliary claws 41*d* protrude on the outer peripheral edge side apart from each other in the width direction (the lateral direction in FIG. 16) at two positions at the tip of the outer peripheral edge side surface (the front side in FIG. 16, and the right side in FIG. 17) of the panel protrusion 41. The lock protrusion 25 of the base member 20 is inserted into the insertion hole 41*c*. Further, the auxiliary claws 41*d* are locked to the vehicle compartment inner edge G of the opening 26 of the base member 20. In this configuration, the separated arms 41*b* are not provided. Thus, when the panel protrusion 41 is inserted into the base member 20 to set the panel member 40, the lock protrusion 25 needs to be locked to the insertion hole 41*f* while the panel protrusion 41 is elastically deformed to the left side in FIG. 17 by the lock protrusion 25. However, in this configuration as well, the lock protrusion 25 is locked to the insertion hole 41*f*, and the auxiliary claws 41*d* are further locked to the base member 20, so that it is possible to obtain the advantageous effect of preventing the detachment of the ceiling lining member 65 (FIG. 3). The configurations and functions are similar to those in FIG. 1 to FIG. 12A-B in other respects.

Although the vehicle interior component is the overhead console in the case described above, the present invention may be applied to other types of vehicle interior components such as part of a center console 67 (FIG. 1) provided in front of the front seats of the vehicle or a glove box 68 (FIG. 1). For example, the present invention is applicable to a heater control unit or a console box constituting the center console 67. Such a vehicle interior component other than the overhead console may also include a base member fixed to the structural member of the vehicle, and a panel member which is attached to the vehicle compartment inner side of the base member so that an outer peripheral portion of the panel member is pressed to a trim which is a lining member of the vehicle, or a resin cover. The lining member may include a cushion member.

According to at least one vehicle interior component in the embodiment described above, it is possible to prevent a panel member which is pressed to a lining member from coming away and thus prevent the lining member from being detached. Moreover, it is not necessary to join the panel member to the base member by fastening members such as screws, so that setting operability is satisfactory.

What is claimed is:

1. A vehicle interior component which is attached to a structural member of a vehicle, the vehicle interior component comprising:
   a base member fixed to the structural member; and
   a panel member attached to a vehicle compartment inner side of the base member so that an outer peripheral portion of the panel member is pressed to a lining member of the vehicle from the vehicle compartment inner side,
   wherein the panel member comprises a panel protrusion protruding on a vehicle compartment outer side in the peripheral part of the outer peripheral edge of the panel member, the panel protrusion having an insertion hole into which a lock portion formed in the base member or a base fixing member fixed to the base member is inserted, and an auxiliary claw protruding on an outer peripheral edge side, and
   the auxiliary claw engages with an outer peripheral wall of the base member to prevent the displacement of the panel protrusion to the vehicle compartment inner side when the outer peripheral portion of the panel member receives a load from the lining member.

2. The vehicle interior component according to claim 1, wherein
   the panel protrusion includes a root side portion, and two arms protruding separately from the root side portion to the vehicle compartment outer side, and the insertion hole is formed between the two arms, and
   the auxiliary claw is formed on the outer peripheral edge side of the panel member in each of the arms.

3. The vehicle interior component according to claim 1 which is an overhead console that is attached to a ceiling structural member of the vehicle.

\* \* \* \* \*